Figure 1:
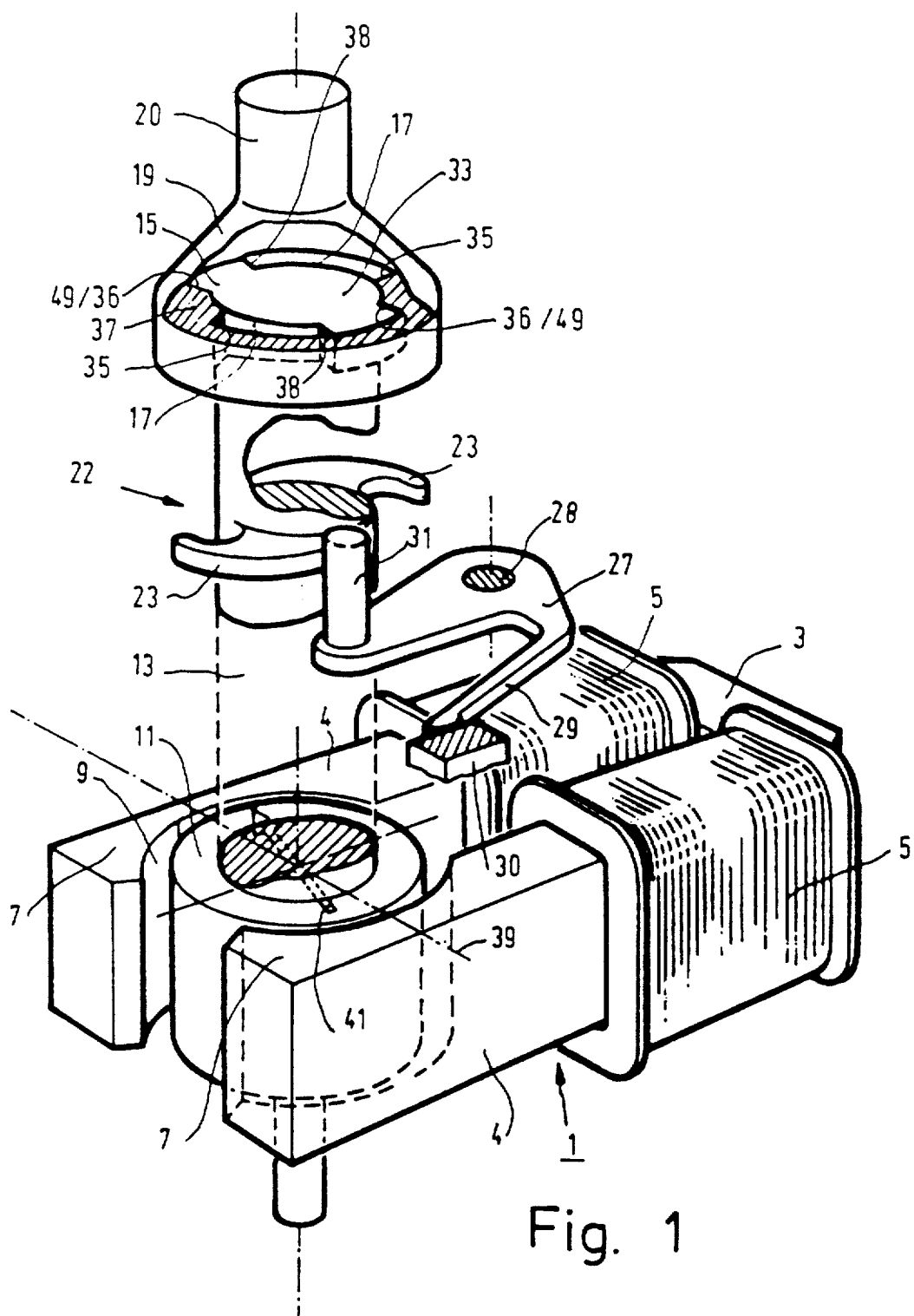

United States Patent [19]

Bertram et al.

[11] Patent Number: 5,118,977
[45] Date of Patent: Jun. 2, 1992

[54] TWO-POLE SINGLE-PHASE SYNCHRONOUS MOTOR WITH PERMANENT-MAGNET ROTOR, AND STARTING DEVICE FOR USE IN THE SINGLE-PHASE SYNCHRONOUS MOTOR

[75] Inventors: Leo Bertram, Stolberg; Hugo Schemmann, Schaesberg, both of Fed. Rep. of Germany

[73] Assignee: U.S. Philips Corporation, New York, N.Y.

[21] Appl. No.: 628,262

[22] Filed: Dec. 14, 1990

[30] Foreign Application Priority Data

Dec. 14, 1989 [DE] Fed. Rep. of Germany ....... 3941204

[51] Int. Cl.⁵ .......................................... H02K 17/26
[52] U.S. Cl. ................................ 310/49 R; 310/162; 310/254; 310/67 R
[58] Field of Search ................... 310/49 R, 216, 218, 310/254, 261, 68 B, 162, 112, 114, 67 R, 152, 154

[56] References Cited

U.S. PATENT DOCUMENTS

| 4,241,270 | 12/1980 | Haydon et al. | 310/218 |
| 4,528,533 | 7/1985 | Mantagu | 310/49 R |
| 4,554,471 | 11/1985 | Bertram et al. | 310/49 R |
| 4,855,629 | 8/1989 | Sato | 310/49 R |

Primary Examiner—Steven L. Stephan
Assistant Examiner—Matthew Nguyen

[57] ABSTRACT

The invention relates to a two-pole single-phase synchronous motor having a permanent-magnet rotor (11), a magnetic detent torque, which viewed over one revolution exhibits positive and negative values with resulting stable and unstable rest positions, the stable rest positions being offset in the positive direction relative to the average direction of the stator field (39) by the asymmetry angle ($\gamma$), and a critical detent torque ($M_{Kikr}$) being active in the parallel position of the stator field (9) and the rotor field (41), and a starting device provided with rotational backlash between a driving member connected to the rotor (11) and a load member, and with a directional blocking device (22).

15 Claims, 6 Drawing Sheets

TWO-POLE SINGLE-PHASE SYNCHRONOUS MOTOR WITH PERMANENT-MAGNET ROTOR, AND STARTING DEVICE FOR USE IN THE SINGLE-PHASE SYNCHRONOUS MOTOR

The invention relates to a two-pole single-phase synchronous motor having a permanent-magnet rotor, a magnetic detent torque, which viewed over one revolution exhibits positive and negative values with resulting stable and unstable rest positions, the stable rest positions being offset by the asymmetry angle in the positive direction relative to the average direction of the stator field, and a critical detent torque $M_{K1kr}$ being active in the parallel position of the stator field and the rotor field, and a starting device provided with rotational backlash between a driving member connected to the rotor and a load member, and with a directional blocking device, the backlash angle $\epsilon$ of the rotational backlash between the load-side and the motor-side members, through which angle the members can rotate relative to each other in the disengaged condition, being limited in the positive and the negative direction of rotation by means of positive and negative backlash walls of the rotor-side and the load-side members. The invention also relates to a starting device for use in a single-phase synchronous motor.

A starting device for a single-phase synchronous motor without auxiliary rotary field is known from the magazine ETZ, Vol. 30, 1978, No. 2, pp. 56 to 60. It is characteristic of the relevant single-phase synchronous motor that when it is switched on it cannot start reliably if the friction torque acting on the rotor shaft is larger than the sum of the position-dependent torque exerted on the magnetic rotor by the stator current and the position-dependent magnetic reluctance torque, hereinafter referred to as detent torque, which is exerted on the magnetic rotor in the non-energized condition of the stator coils as a result of the changing magnetic energy during a mechanical rotation of the rotor. The rotor positions in which the torque exerted by the current is zero are then very critical. This is the case if the rotor flux linked to the stator coils passes through a maximum, i.e. when the rotor field and the stator field are parallel. This is twice per revolution for a two-pole rotor-stator configuration. By a suitable design of the air gap between the rotor and the stator it can be achieved that the zero crossing of the detent torque does not coincide with the parallel position and the detent torque tends to rotate the rotor out of this position. However, this is possible only if the friction torque in this position is smaller than the detent torque in this position. In practice this may result in the friction torque permissible for starting being reduced to 10 to 50% of the motor stalling torque after starting. Consequently, there is always a risk that an apparatus fails to start in the case of unfavourable tolerance and load conditions.

Therefore, said publication proposes to eliminate the starting problems in the case of high frictional loads by rotating the rotor out of the parallel position by means of an additional mechanism. A spring and pawl construction exerts a torque on the rotor to assist the detent torque in the parallel position and thereby move the rotor in the positive direction out of the critical position in the case of larger friction torques, the positive direction being defined as the direction of rotation in which the detent torque acts in the parallel position. However, the described auxiliary mechanism is intricate and occupies additional volume.

GB-A 1,413,782 discloses an arrangement for starting a synchronous motor in which the rotor is rotatably mounted on a fixed shaft and a coupling element arranged on the rotor engages with circumferential backlash in a complementary coupling element which forms part of a pinion, so that the rotor is not immediately subjected to the full load. In conjunction with an anti-reversing device the backlash angle at the rotor side is then limited to substantially 66° according to the drawing.

DE-A 3,420,371 discloses an arrangement for starting a synchronous motor in which a permanent-magnetically excited rotor is mounted on the drive shaft with circumferential backlash to ensure starting under load. This is in order to provide a substantially load-free starting cycle for the rotor, which has a first coupling element which, after passage of the rotor through the circumferential backlash, engages with a second coupling element connected to the drive shaft so that the drive shaft is driven. In order to ensure a specific direction of rotation of the rotor a directional blocking device is provided, which permits rotation of the load in one direction and which inhibits rotation of the load in the other direction.

This arrangement has the advantage that during passage through the circumferential backlash only the bearing friction of the rotor acts on the drive shaft and the rotor motion is not impeded by any additional frictional torques or moments of inertia. When the synchronous motor is used for driving a liquid pump, for example the draining pump of a washing machine, it may happen that after a longer period of stoppage the seals stick to the drive shaft and impede starting of the rotor. This will not pose a problem if initially the rotor can rotate freely on the drive shaft.

DE-A 3,420,371 describes a directional blocking device in the form of a free-wheel bearing which permits rotation in only one direction. In another variant a latching pawl engages with a toothed wheel having a large number of ratchet teeth to block one of the two possible directions of rotation, the blocking angle being small owing to the large number of teeth. The blocking angle is to be understood to mean the maximum angle through which the rotor can rotate, depending on its position in the blocking direction, before it is stopped.

DE-UM 87 03 451 describes a self-starting synchronous motor with an anti-reversing device, which motor comprises a rotor shaft, which is journalled in the housing and which carries the rotor, and coupling means between the rotor and the parts which transmit the rotor rotation, which coupling means allow freewheeling through a given angle, the motor further comprising means which inhibit rotation of the rotor in the incorrect direction by means of a mechanical stop, in which motor a) a stop member is arranged on the rotor shaft so as to be locked in rotation,
b) the rotor is rotatably mounted on the rotor shaft,
c) the stop member is driven by the rotor in the desired direction of rotation of the rotor, and
d) the stop member is urged into a fixed engagement means in the housing by the rotor motion in the incorrect direct of rotation.

As a result of its construction this arrangement enables a circumferential backlash angle smaller than approximately 140° to be obtained according to the drawing. When only one blocking nose is used the backlash angle can be approximately 300°. Blocking is effected in two specific angular positions of the load, neither these positions nor the direction of rotation to be blocked being defined any further.

In all the arrangements described above it is assumed that when the voltage is applied the rotor is in a rest position in which the direction of magnetisation of the rotor is oriented at an angle relative to the direction of the stator field, which is caused by the detent torque which rotates the rotor out of the parallel position. The stator field then exerts a torque on the rotor, which can move freely within the circumferential backlash range. However, this approach is not satisfactory in practice.

In an arrangement without anti-reversing device it is ensured that the backlash can fulfil the desired function only if the friction torque of the load is smaller than the critical detent torque, which is the detent torque which exists in the parallel position and which tends to rotate the rotor out of this critical position. When the motor is switched off and the system subsequently runs out it may occur during run-out of the system that the wall which limits the circumferential backlash in the positive direction of rotation of the rotor, hereinafter referred to as the positive backlash wall, remains in a position in which the rotor is in the parallel position and the positive rotor-backlash wall engages against the positive load-backlash wall.

If the load friction is high this is the case when the arrangement is switched off in the positive direction of rotation. The positive rotor-backlash wall is then urged against the positive load-backlash wall by the detent torque in the positive direction of rotation. The rotor is then positively coupled to the load in the positive direction. When the load friction is larger than the critical detent torque the rotor will remain in the parallel position and will fail to start upon re-energisation. This situation applies to a range of positions around the parallel positions, which range varies depending on the magnitude of the load friction.

This cancels the effect of the backlash coupling and starting is not possible. The arrangement is blocked.

During switching off in the negative direction of rotation the positive load-backlash wall may also remain in the described position. However, in operation the negative rotor-backlash wall now engages against the negative load-backlash wall and the rotor can be set into motion upon energisation. However, surprisingly it has been found that even in the case of a predetermined negative direction of rotation starting is not assured. When the motor is switched on repeatedly it will generally start but occasionally it will fail to start. Although this effect may not occur very frequently it is not acceptable for the use of the motor.

Also in arbitrary positions of the load and rotor backlash walls and when the rotor is initially set into motion upon starting one of the critical situations described above may arise owing to the irregular starting process of synchronous motors caused by dynamic changes in the position of the backlash walls.

The directional blocking devices mentioned in DE-A 3,420,371 and DE-UM 87 03 451 serve to define a direction which dictates the direction of the unit to be driven. This may be the positive but also the negative direction. The directional blocking devices then act on the load and, only via the backlash, i.e. not directly on the rotor. The effect of the directional blocking device and a specific direction of rotation on the theoretical possibility of starting is not described.

It is merely stated in general terms that said blocking devices block one direction and liberate the other direction. By way of example DE-A 3,420,371 mentions freewheel bearings, which generally act directly, and click-and-pawl arrangements with small blocking angles.

In DE-UM 87 03 451 the load is blocked twice in a specific position every revolution. This results in a blocking angle of approximately 180°. However, in this arrangement the backlash between the rotor and the load is limited to approximately 140° according to the drawing. When only one blocking nose is used the backlash angle can be approximately 300°. The backlash means are arranged directly on the rotor.

In GB-A 1,413,782 the system is blocked by cooperation between the rotor and the load, which enable freewheeling to be obtained only in specific relative positions.

If the negative direction of rotation is to be blocked load frictions larger than the critical detent torque lead to situations as described above for an arrangement without blocking device and the motor may remain in the parallel position.

If the positive direction of rotation of the load is blocked and the positive load-backlash wall comes to rest in a position in which the rotor is in the parallel position when this wall engages against the positive rotor-backlash wall, the rotor surprisingly fails to start upon energisation, even if the negative rotor-backlash wall has initially stopped at the negative load-backlash wall, i.e. at an angle relative to the stator field, during running-out.

The starting devices mentioned in DE-A 3,420,371 using circumferential backlash and fast-blocking directional blocking devices acting upon the load without a specified blocking direction therefore cannot guarantee a correct starting performance of synchronous motors if the load friction is larger than the critical detent torque. Situations in which the rotor fails to start may always occur. The same applies to the arrangement in accordance with DE-UM 87 03 451 and in GB-A 1,413,782.

It is an object of the invention to ensure in a constructionally simple manner that an apparatus which is driven by a single-phase synchronous motor starts correctly and in which the friction torques prevailing during starting in the parallel position are larger than the critical detent torque.

According to the invention this object is achieved by means of six main embodiments.

In a first main embodiment
for loads for which the critical detent torque is smaller than the load torque prevailing during running-out or starting in the parallel position there is provided a directional blocking device which intervenes depending upon the position of the rotor, which device in the 180° spaced-apart rotational positions of the rotor, without the cooperation of the load-side member, which is coupled via rotational backlash, influences the rotor to block the positive directions of rotation in which the direction of magnetisation of the rotor and the stator field direction subtend a negative blocking angle K larger than the asymmetry angle $\gamma$, and in the other rotor positions does not obstruct the rotation of the rotor, the backlash angle ε is larger than the blocking angle K, and the quotient of the load friction torque and the load inertial moment is larger than the quotient of the detent torque and the rotor inertial moment.

The invention is based on the recognition of the fact, which is new to the expert, that even when the positive direction of rotation of the load is blocked and the rotor has initially stopped with the negative rotor-backlash wall at the negative load-backlash wall during run-out, the positive rotor-backlash wall may reach the positive load-backlash wall when the voltage is applied again at an unfavourable instant of the sinewave voltage. If at this instant the positive load-backlash wall is in a position in which the rotor is in the parallel position while this wall engages with the positive rotor-backlash wall, the rotor may stop and remain in this position. This applies in particular to the situation in which the backlash walls of the rotor and the load come gently into contact with one another. If the positive direction is blocked by means of a fast-acting blocking pawl, sticking in the parallel position is very likely to occur because on account of the complex dynamic starting characteristics involving the interplay between detent torque, current torque and mass moment of inertia stalling of the rotor in the parallel position may occur more frequently since the positive load-backlash wall cannot be moved in the positive direction. Starting in the positive direction is then impossible.

If the quotient of the load friction and the inertial load moment is large enough it is avoided that the positive rotor-backlash wall halts at the positive load-backlash wall during running out in the negative direction of rotation as a result of shifting of the load.

This ensures that when the rotor during running out in the negative direction of rotation stops with the negative rotor-backlash wall at the negative load-backlash wall in the parallel position, but can start even if the load friction is larger than the critical detent torque. In this case the rotor can assume the rest position dictated by the detent torque in that it utilises the backlash to move away from the negative load-backlash wall in the positive direction of rotation.

If during running out the positive load-backlash wall stops in such a position that the rotor is in parallel position with this wall against the positive rotor-backlash wall, the blocking device which acts upon the rotor, whose negative rotor-backlash wall engages with the negative load-backlash wall during running out in the negative direction, will prevent the rotor from reaching the positive load-backlash wall with its positive rotor-backlash wall and thus the parallel position in the case of re-energisation in the positive direction of rotation, i.e. in the case that the backlash angle ε is larger than the blocking angle K. This precludes sticking of the rotor in the parallel position.

A special embodiment is characterized in that the backlash angle ε is larger than 90° minus the asymmetry angle γ, preferably 120° to 140°. If the backlash angle is larger than 90° − γ, the detent torque will urge the negative rotor-backlash wall against the negative load-backlash wall in the described position of the positive load-backlash wall; it is advantageous if the blocking device blocks the rotor in a position which is offset relative to the parallel position by a blocking angle K which is larger than γ and which is situated before the parallel position viewed in the positive direction of rotation. If the backlash angle ε is approximately 120° to 140° the blocking angle K will be approximately −90°. In this case the rotor is blocked when its direction of magnetisation extends substantially perpendicularly to the stator field and the starting torque is maximal. This guarantees starting if the motor torque is larger than the load torque. The critical detent torque is then insignificant as compared with the known starting devices. The second blocking position is then shifted through 180° relative to −90° and situated at +90°.

In a modification of the first main embodiment of the invention the directional blocking device comprises a blocking member which is movably supported at the housing side and two blocking noses which are locked in rotation to the rotor, and the rotational backlash is provided by a first coupling part, which is formed on the rotor shaft or is fixedly connected to said shaft as a separate part and which comprises laterally outward drive projections having substantially radial positive and negative rotor-backlash walls, and a shaped part, which is situated on the load and around which the coupling part engages, which shaped part has inward load projections with substantially radial positive and negative load-backlash walls, the range of free rotation between the outward and inward projections being equal to the backlash angle ε.

The negative load-backlash and rotor-backlash walls are those walls which engage with one another during operation in the negative direction of rotation of the rotor and the positive load-backlash and rotor-backlash walls engage when the rotor has rotated through the backlash in the positive direction. This definition also applies to the further arrangements described hereinafter with mechanisms in which the backlash means are arranged on the second stage of the mechanism whose direction of rotation is opposed to that of the rotor. The names of the backlash walls are always referred to the direction of rotation of the rotor.

A second main embodiment is characterized in that a drive pinion is arranged on the rotor shaft, which is fixedly connected to the rotor, and meshes with a transmission wheel having an integral reduction ratio relative to the drive pinion, on the transmission wheel a coupling member having laterally inward drive projections with positive and negative rotor-backlash walls is provided, which drive projections cooperate with load projections provided on a load shaft and having load-backlash walls, the transmission wheel is provided with a number of blocking noses, corresponding in number to twice the reduction ratio, which blocking noses in conjunction with a blocking member, which is supported on the housing, and dependent upon the position of the transmission wheel and hence directly dependent upon the rotor position block the positive direction of rotation of the rotor in a rotary position in which the direction of magnetisation of the rotor and the stator field direction subtend a negative blocking angle K larger than the asymmetry angle γ, and in the other rotor positions do not obstruct the rotation of the rotor, a backlash angle ε is provided between the rotor-backlash walls of the coupling member arranged on the transmission wheel and the load-backlash walls of the load projection arranged on the load shaft to allow a free rotation of the rotor through an angle larger than the blocking angle K, preferably larger than 90° − γ, and the quotient of the load friction torque and the load inertial moment is larger than the quotient of the detent torque and the rotor inertial moment.

In a third main embodiment this configuration is inverted in that a drive pinion is arranged on the rotor shaft, which is fixedly connected to the rotor, and meshes with a transmission wheel having an integral reduction ratio relative to the drive pinion, on the transmission wheel a coupling member having laterally inward drive projections with positive and negative rotor-backlash walls is provided, which drive projections cooperate with load projections provided on a load shaft and having load-backlash walls, a number of blocking members, corresponding in number to twice the reduction ratio, are rotatably supported on the housing, which blocking members, in conjunction with two blocking noses arranged symmetrically on the transmission wheel and dependent upon the position of the transmission wheel and hence directly dependent upon the rotor position, block the positive direction of rotation of the rotor in a rotary position in which the direction of magnetisation of the rotor and the stator field direction subtend a negative blocking angle K larger than the asymmetry angle $\gamma$, and in the other rotor positions do not obstruct the rotation of the rotor, a backlash angle $\epsilon$ is provided between the rotor-backlash walls of the coupling member arranged on the transmission wheel and the load-backlash walls of the load projection arranged on the load shaft to allow a free rotation of the rotor through an angle larger than the blocking angle K, preferably larger than $90° - \gamma$, and the quotient of the load friction torque and the load inertial moment is larger than the quotient of the detent torque and the rotor inertial moment.

These embodiments lead to constructional advantages in combination with a reduced overall height. Moreover, the blocking means can be arranged at a more favourable location.

In a fourth main embodiment of the invention a drive pinion is arranged on the rotor shaft, which is fixedly connected to the rotor, and meshes with a transmission wheel having an integral reduction ratio relative to the drive pinion, on the transmission wheel a coupling member having one or more laterally inward drive projections with positive and negative rotor-backlash walls is provided for cooperation with at least one load projection provided on a load shaft and having load-backlash walls, an element having one or more blocking noses which are uniformly spaced along its circumference are provided on the transmission wheel and cooperate with a blocking member having a blocking pin, the backlash angle e between the drive projections and the load projections is substantially equal to 360° divided by the number of blocking noses which, dependent upon the position of the transmission wheel and hence directly dependent upon the rotor position, block the positive direction of rotation of the rotor in a rotary position in which the direction of magnetisation of the rotor and the stator field direction subtend a negative blocking angle K larger than the asymmetry angle $\gamma$ and preferably equal to $-90°$, and do not obstruct the rotation of the rotor in the other rotor positions, and the quotient of the load friction torque and the load inertial moment is larger than the quotient of the detent torque and the rotor inertial moment.

The use of a small number of blocking noses has constructional advantages.

In a fifth embodiment of the invention a drive pinion is arranged on the rotor shaft, which is fixedly connected to the rotor, and meshes with a transmission wheel having an integral reduction ratio relative to the drive pinion, the transmission wheel is provided with at least one arcuate path of movement having rotor-backlash walls which limit the backlash movement, the path of movement between the rotor-backlash walls is engaged by at least one load projection which is coupled to the load and has load-backlash walls, two blocking noses are fixedly arranged on the transmission wheel and in conjunction with a blocking member which is supported on the housing block the transmission wheel in the positive direction of rotation in a position in which the direction of magnetisation of the rotor and the stator field direction subtend a positive or negative blocking angle K of approximately 90°, and do not obstruct the rotation of the rotor in the other rotor positions, the range of free movement of the load projection along the path of movement exhibits a backlash angle $\epsilon$ of approximately 180°, and the quotient of the load friction torque and the load inertial moment is larger than the quotient of the detent torque and the rotor inertial moment.

The fifth main embodiment can be modified, yielding a sixth main embodiment in which a drive pinion is arranged on the rotor shaft, which is fixedly connected to the rotor, and meshes with a transmission wheel having an integral reduction ratio relative to the drive pinion, the transmission wheel is provided with at least one drive projection having rotor-backlash walls and cooperating with at least one load-side path of movement having load-backlash walls, two blocking noses are fixedly arranged on the transmission wheel and in conjunction with a blocking member which is supported on the housing block the transmission wheel in the positive direction of rotation in a position in which the direction of magnetisation of the rotor and the stator field direction subtend a positive or negative blocking angle K of approximately 90°, and do not obstruct the rotation of the rotor in the other rotor positions, the range of free movement of the drive projection along the path of movement exhibits a backlash angle $\epsilon$ of approximately 180°, and the quotient of the load friction torque and the load inertial moment is larger than the quotient of the detent torque and the rotor inertial moment.

The fifth and the sixth main embodiment are of compact construction and are very suitable for use in small domestic appliances.

In modifications of the fifth and the sixth main embodiment the reduction ratio is 1:4 and during engagement of the negative rotor-backlash and load-backlash walls in the parallel position the blocking angle K', i.e. the free angle through which the blocking noses on the transmission wheel can move in the negative direction of rotation of the transmission wheel before one of said projections abuts against the blocking member, is approximately 22.5°, and the path of movement is a slot and the backlash walls of the path of movement are the slot ends. This is very suitable for driving personal-care apparatuses, such as for example depilation apparatuses, in which a compact and robust construction and a high immunity to tolerances are essential.

In a further modification of the fifth and the sixth main embodiment, in the case of more than one path of movement which each cooperate with one load projection, the paths are situated at different radii in order to obtain a larger backlash angle. This enables a satisfactory distribution of the load transmission to be obtained.

Figure 2:
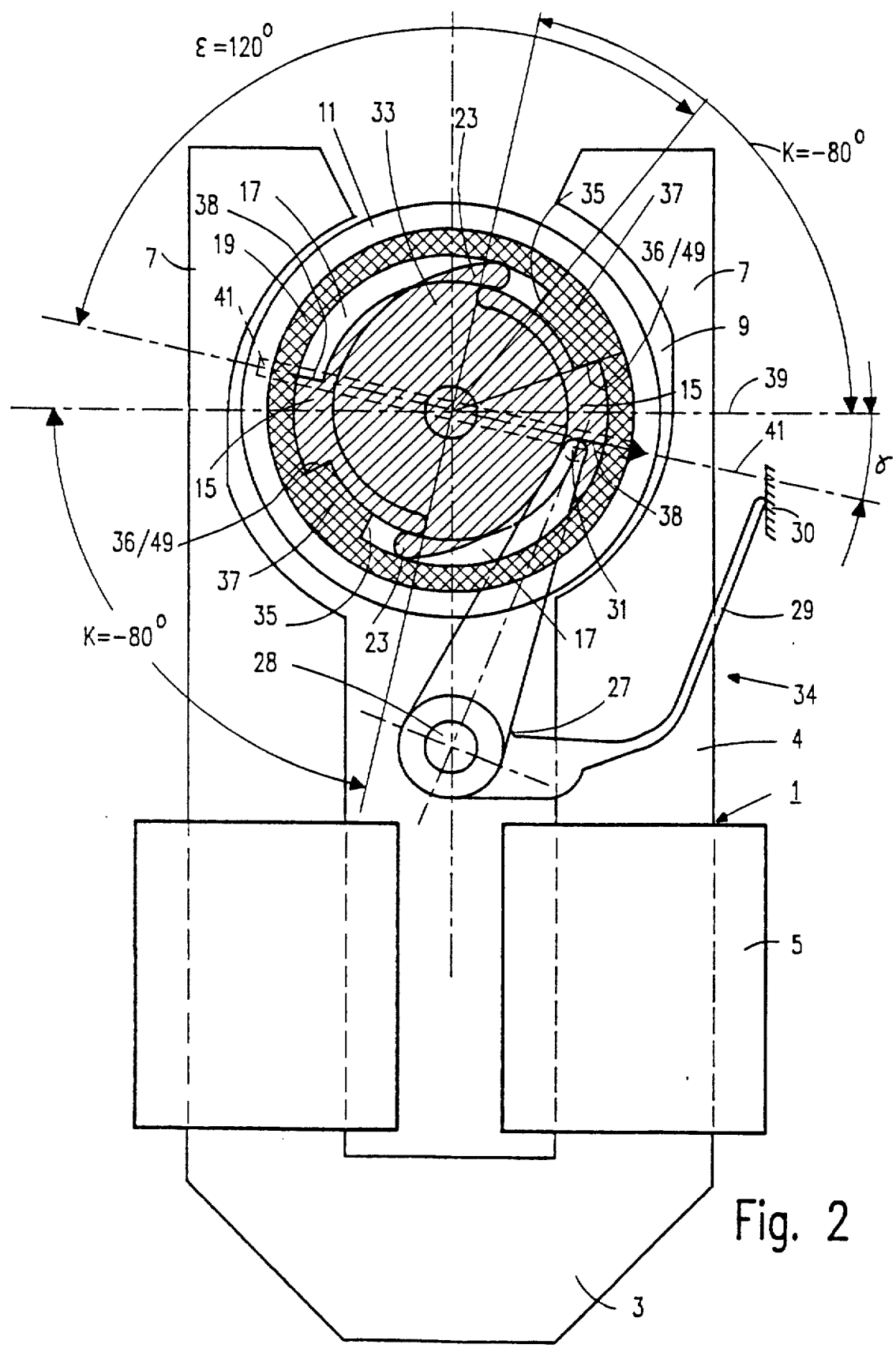
Figure 3:
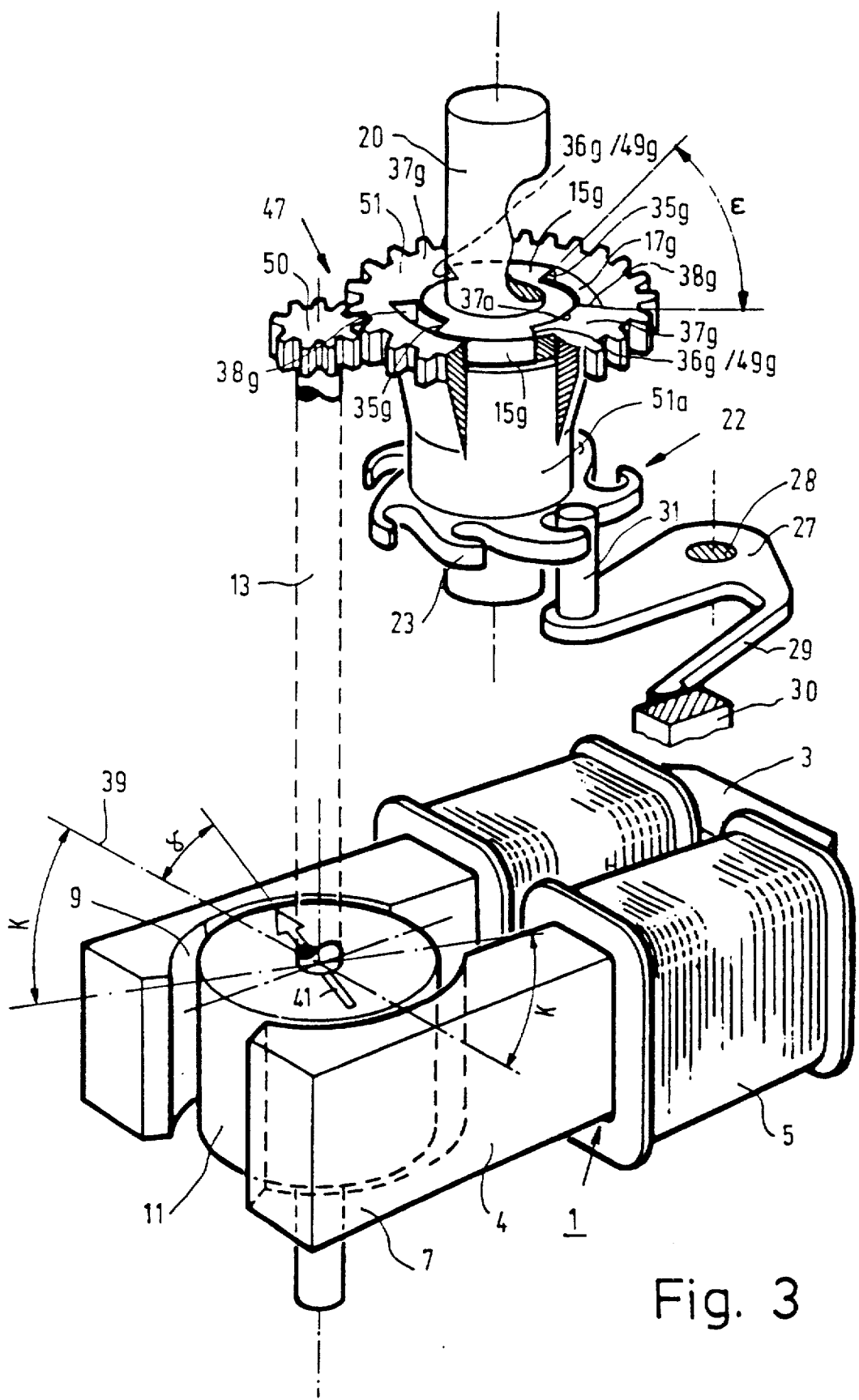
Figure 4:
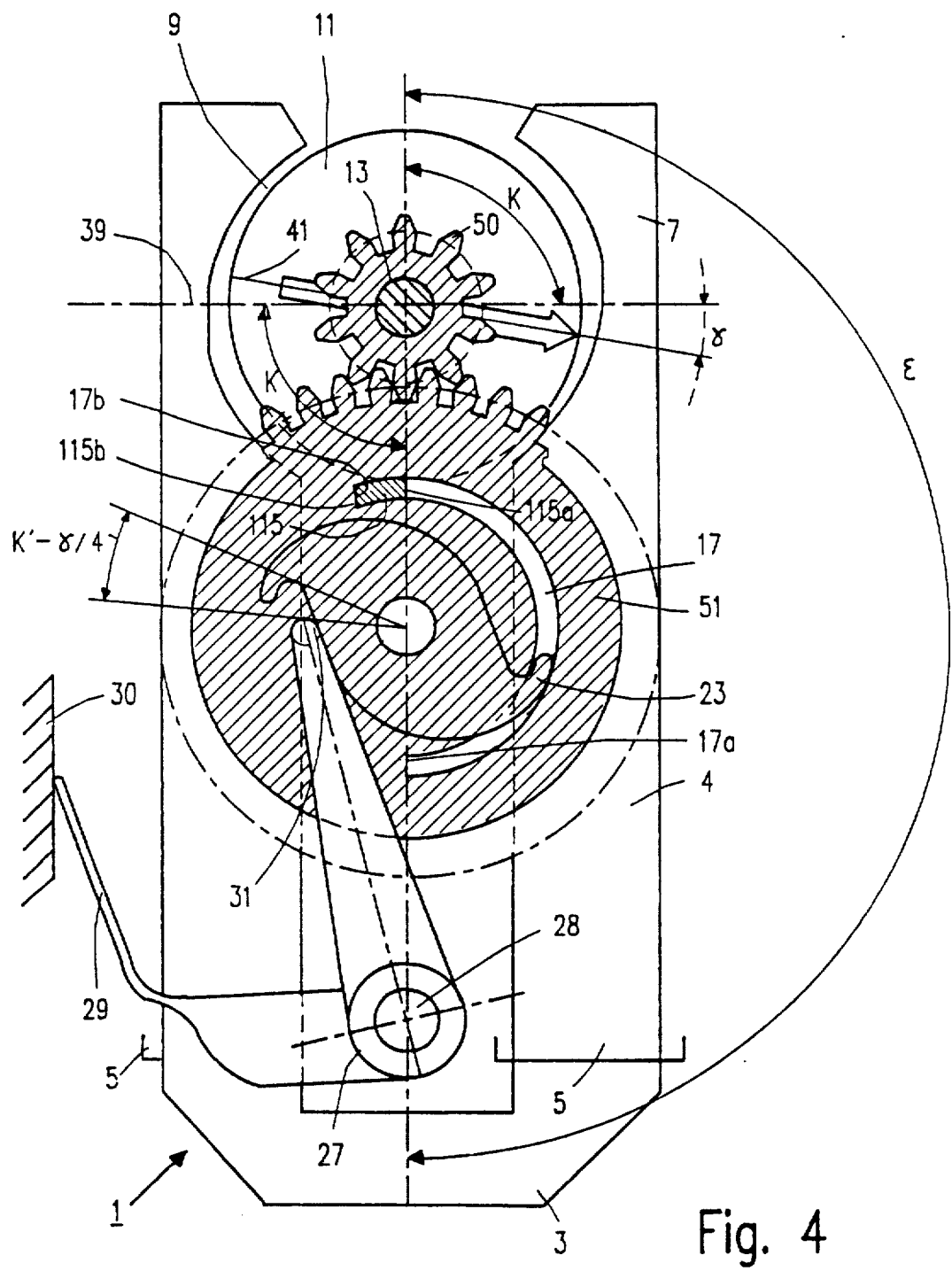
Figure 4A:
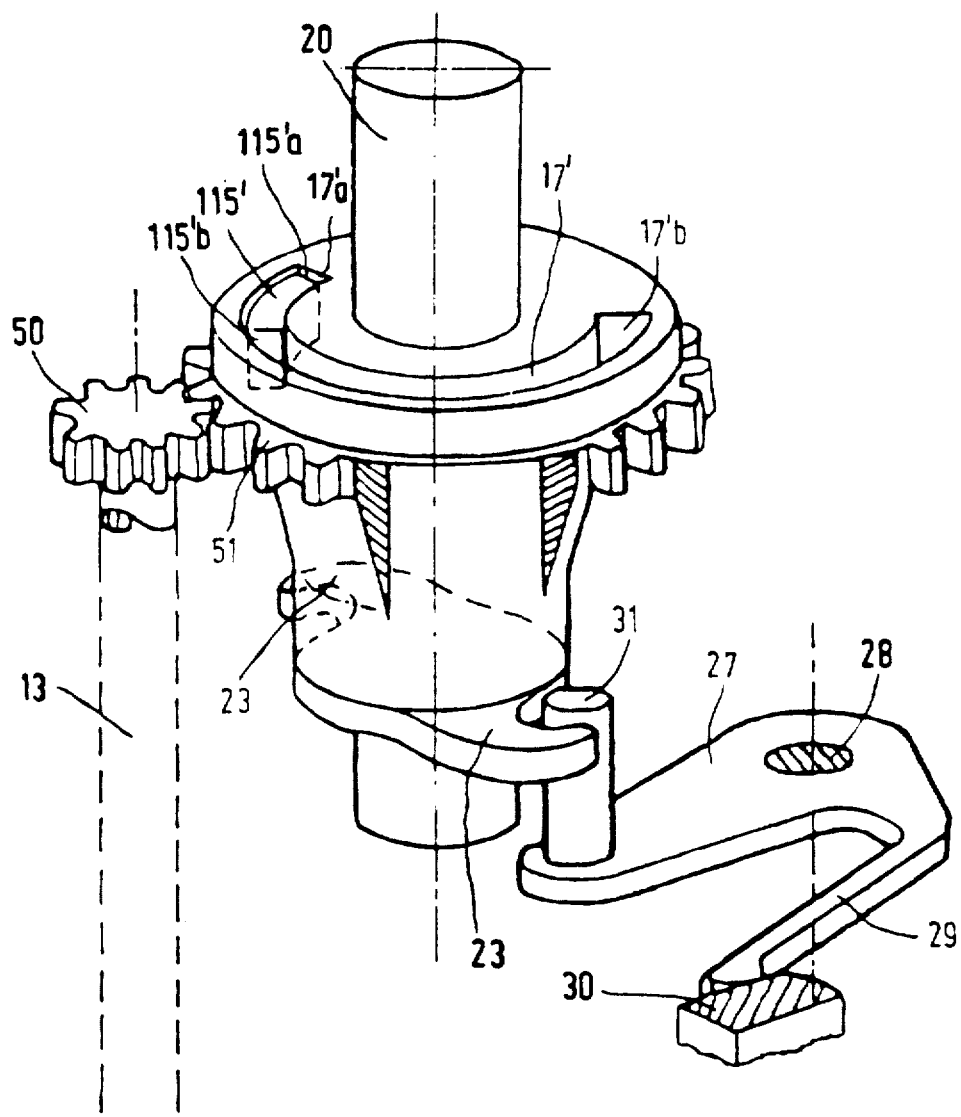
Figure 5:
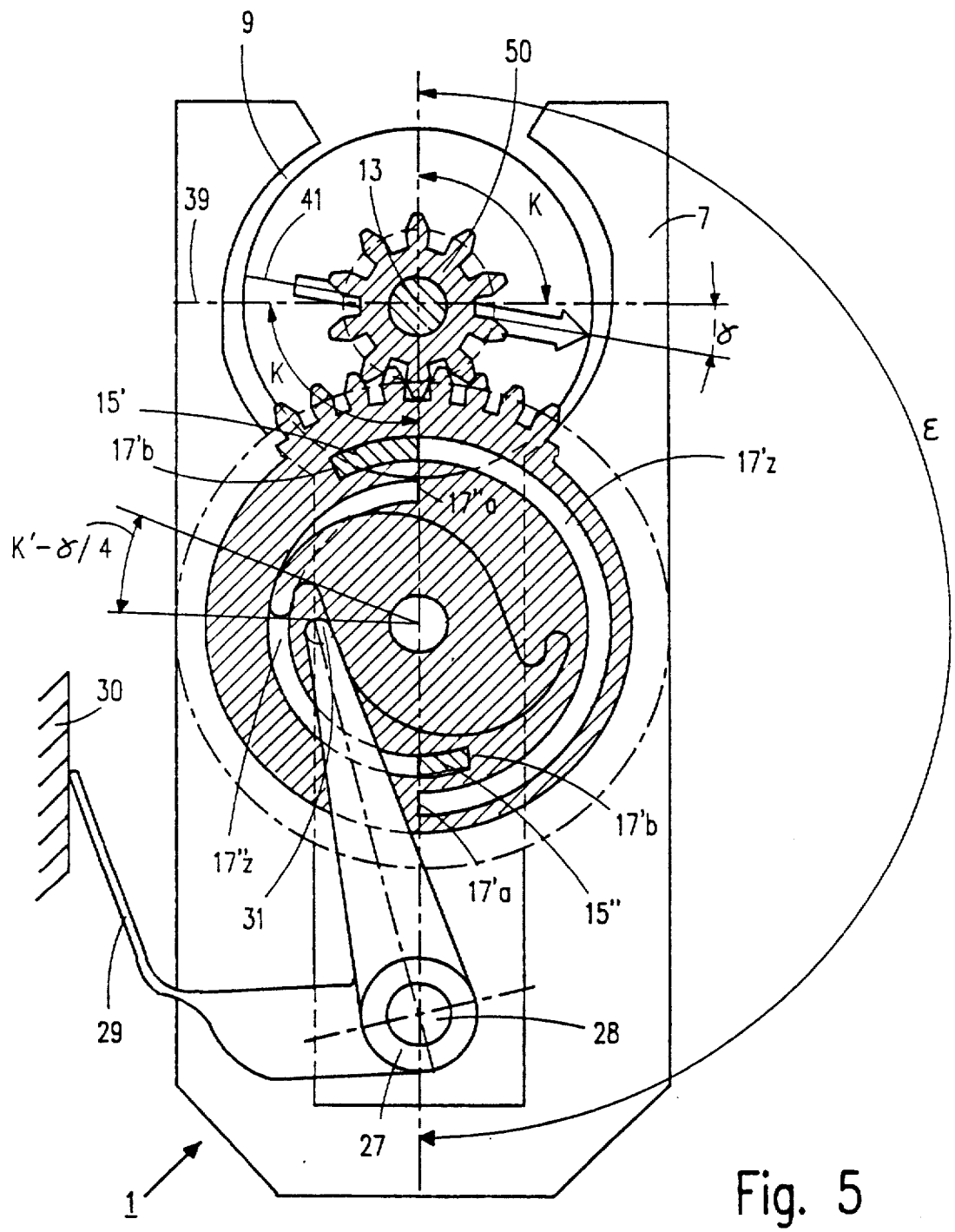

The invention will now be described in more detail with reference to the drawings. In the drawings:

FIG. 1 shows diagrammatically a first main embodiment of a single-phase synchronous motor comprising a starting device and driving a load shaft, FIG. 2 is a diagrammatic plan view of the arrangement of the starting device shown in FIG. 1 to explain its operation, FIG. 3 shows diagrammatically a second main embodiment comprising a starting device using a mechanism with a plurality of blocking noses, FIG. 4 is a plan view of a fifth main embodiment comprising a starting device using a mechanism having only two blocking noses and a larger backlash, FIG. 4a shows diagrammatically a sixth main embodiment which deviates from the fifth main embodiment in that the projections and path of movement at the rotor side and the load side have been interchanged, the drive motor not being shown normally, and FIG. 5 is a plan view of a modification of the starting device shown in FIG. 4, comprising two separate paths of movement and load cams arranged at two separate different radii.

FIGS. 1 and 2 show a two-pole single-phase synchronous motor 1 whose U-shaped stator iron 3 comprises two limbs 4 carrying coils 5. The limbs 4 are formed with polepieces 7, a permanent-magnet rotor 11 comprising a shaft 13 and being mounted for rotation between said polepieces in a stator field 9.

The rotor shaft 13 is provided with drive projections 15 which engage in coupling slots 17 in a load member 19 from which a load shaft 20 extends. The coupling slots 17 have a length as defined hereinafter, enabling the drive projections 15 to be rotated freely through a specific backlash angle ε (FIG. 2). In this way a rotational backlash is obtained between the load member 19 and the rotor shaft 13.

The rotor shaft 13 has been provided with two blocking noses 23. The blocking noses 23 cooperate with a blocking member 27 which is rotatable about a fixed pivot 28 on the chassis. The blocking member 27 comprises a spring arm 29 which is supported on a fixed abutment 30 on the chassis. The blocking member 27 carries a blocking pin 31 which is adapted to cooperate with the blocking noses 23. To this end the spring arm 29 urges the blocking member and thus the blocking pin 31 constantly towards the rotor shaft 13. A very simple construction is obtained if the blocking member 27, the blocking pin 31, the spring arm 29 and the abutment 30 are formed as a plastics injection-moulded part.

FIG. 2 shows the arrangement of FIG. 1 in a plan view, which again shows the single-phase synchronous motor 1 with its U-shaped stator iron, the limbs 4, the coils 5 and the stator poles 7, the rotor 11 being arranged in the stator field 9. A coupling member 33 is fixedly connected to the rotor 11 and carries the drive projections 15. The coupling member 33 is shown hatched. The blocking noses 23 are disposed underneath and connected to the coupling member.

The load member 19 with the coupling slots 17 is disposed around the coupling member 33. The coupling slots 17 define paths of movement whose length is bounded by positive and negative load-backlash walls 35, 36 formed on load projections 37 which project inwardly from the load member 19. The drive projections 15 with positive and negative rotor-backlash walls 38, 49 engage in the paths of movement or coupling slots 17. For the sake of clarity the load member 19 with the load projections 37 is shown cross-hatched.

The drawing also shows the blocking member 27, which is pivotable about the fixed pivot 28 on the chassis, and its spring arm 29 and the fixed abutment 30 on the chassis. The front end of the blocking member 27 carries the blocking pin 31.

As can be seen in FIG. 2, the average field direction 39 of the stator field 9 and the average field direction 41 of the two-pole magnetised rotor 11 subtend an asymmetry angle γ. This is the angle through which the rotor is moved relative to the direction 39 of the stator field in the stationary condition under the influence of the detent torque. After running out the rotor, if it can move freely, remains in a stable rest position in the direction of the line 41.

The backlash angle ε is the angle through which the coupling member 33 can move freely relative to the load member 19 if the blocking member 27 is ignored. The backlash angle ε is dictated by the free distance from the load-backlash walls 35/36 of the coupling slots 17 to the rotor-backlash walls 38/49 minus the width of the drive projection 15. The blocking angle K is also indicated and is the angle between the stator field direction 39 and the direction 41 of magnetisation at which the rotor is blocked in the positive direction of rotation before the parallel position of the two fields is reached. The backlash angle ε should be larger than the blocking angle K in order to ensure that, when the drive projection 15, which is fixedly connected to the rotor 11, returns from the position in which its negative rotor-backlash wall 49 engages against the negative load-backlash wall 36 of the load projection, the rotor is blocked before the positive rotor-backlash wall 38 of the drive projection reaches the positive load-backlash wall 35 of the load projection in a position in which in the case of engaging positive load-backlash and rotor-backlash walls 35, 38 the direction 41 of magnetisation of the rotor 11 would be parallel to the stator field direction 39. The blocking point should be situated before the parallel position by at least an angle equal to the asymmetry angle γ.

In order to avoid that when the voltage is switched off the rotor is moved by the load, thereby causing the positive rotor-backlash and load-backlash walls to come into contact during running-out, the quotient of the load friction torque and the load inertial moment should be larger than the quotient of the detent torque and the rotor inertial moment.

FIG. 3 shows a second main embodiment in which the directional blocking device 22 is arranged on a transmission between the rotor shaft 13 and the load shaft 20. FIG. 3 again shows diagrammatically the single-phase synchronous motor 1 of FIG. 1. The rotor shaft 13 carries a pinion 50 which is in mesh with a transmission wheel 51 with which it forms a transmission 47. The transmission wheel 51 has a cylindrical recess into which drive projections 37g project inwardly. Thus, arcuate paths of movement are formed between the projections 37g, which paths are bounded by rotor-backlash walls, i.e. a positive rotor-backlash wall 38g and a negative rotor-backlash wall 49g.

The load shaft 20 traverses the transmission wheel 51. Projections 15g are secured to the load shaft 20 and have lateral backlash walls, i.e. a positive load-backlash wall 35g and a negative load-backlash wall 36g. The load projections project into the path of movement 17g. Since the width the load projections 15g is smaller than that of the paths 17g a backlash angle $\epsilon$ is formed between the load projections 15g and the paths 17g.

The transmission wheel 51 has a plurality of blocking noses 23 arranged on an axial extension 51a of this wheel 51. In the same way as in the embodiments shown in FIGS. 1 and 2 the blocking noses 23 in combination with a blocking pin 31 form a directional blocking device 22. The blocking pin 31 is secured to a blocking member 27, which is pivotable about a fixed pivot 28 on the chassis and which has a spring arm 29 which is supported on a fixed abutment 30 on the chassis.

In the embodiment shown in FIG. 3 the drive pinion 50, which can be driven locked in rotation to the rotor 11 via the rotor shaft 13, is in mesh with the transmission wheel 51, which has an integral reduction ratio relative to the drive pinion 50. The backlash angle $\epsilon$ between the transmission wheel 51 and the load shaft 20 allows a free rotation of the rotor larger than the blocking angle K, preferably larger than 90° minus the asymmetry angle $\gamma$. The transmission wheel 51 has been provided with a number of blocking noses 23 corresponding to twice the reduction ratio, which blocking noses dependent upon the position of the transmission wheel 51 and hence directly dependent upon the rotor position block the positive direction of rotation of the rotor 11 in the rotary position in which the direction of magnetisation of the rotor 11 and the stator field direction 39 subtend a negative blocking angle K larger than the asymmetry angle.

In a third embodiment, not shown, as distinct from the second main embodiment shown in FIG. 3, a plurality of blocking members 27 corresponding in number to the reduction ratio are rotatably supported on the transmission wheel 51 and cooperate with two blocking noses, which are arranged symmetrically on the transmission wheel 51, to block, dependent upon the position of the transmission wheel 51 and hence directly dependent upon the rotor position, the positive direction of rotation of the rotor in a rotary position in which the direction 41 of magnetisation of the rotor 11 and the stator field direction 39 subtend a negative blocking angle K larger than the asymmetry angle $\gamma$, the rotation of the rotor not being obstructed in the other rotor positions.

In a fourth main embodiment, not shown, based on the second main embodiment comprising the transmission, the backlash angle $\epsilon$ between the drive projections 37g and the load projections 15g is substantially equal to 360° divided by the number of blocking noses 23 which, dependent upon the position of the transmission wheel 51 and hence directly dependent upon the rotor position, block the positive direction of rotation of the rotor in a rotary position in which the direction 41 of magnetisation of the rotor 11 and the stator field direction 39 subtend a negative blocking angle K larger than the asymmetry angle $\gamma$ and preferably equal to $-90°$, and do not obstruct the rotation of the rotor in the other rotor positions.

Depending upon the reduction ratio and the number of blocking noses or blocking members the rotor 11 can be rotated back through several revolutions in the positive direction of rotation before it is blocked in the described position substantially perpendicular to the stator field.

In a fifth main embodiment shown in FIG. 4, as distinct from the embodiment shown in FIG. 3, in which a plurality of blocking noses 23 are fixedly connected to the transmission wheel 51, the transmission wheel 51 has an arcuate path of movement 17 with backlash walls 17a and 17b into which a projection 115 of the load shaft 20 projects. The transmission wheel 51 comprises only two symmetrically disposed blocking noses 23. In this case the backlash angle $\epsilon$ is 180° and the blocking angle K is $-90°$.

FIG. 4a illustrates a sixth main embodiment similar to FIG. 4 but shows only the starting device without the actual drive motor. As distinct from the fifth main embodiment shown in FIG. 4, the transmission wheel 51 comprises a drive projection 115' with rotor-backlash walls 115'a, 115'b instead of the arcuate path of movement and the load shaft 20 comprises an arcuate path of movement 17' with load-backlash walls 17'a, 17'b instead of the load projection.

FIG. 5 shows a modified starting device similar to that in FIG. 4, like parts bearing the same reference numerals. FIG. 5 shows two paths of movement 17', 17'', which each cooperate with a projection 15', 15''. In order to obtain a larger backlash angle the paths of movement 17', 17'' are disposed at different radii and are 180° spaced apart in the circumferential direction. The backlash angle $\epsilon$ is again 180° and the blocking angle K is $-90°$.

All the functional inversions of the paths of movement and the projections fall within the scope of the invention.

We claim:

1. A two-pole single-phase synchronous motor having a stator (3) and a permanent-magnet rotor (11) with a magnetic detent torque, which viewed over one revolution exhibits positive and negative values with resulting stable and unstable rotor rest positions, where positive refers to the direction of rotation of the rotor and negative the opposite, the stable rest positions of the rotor being offset by an asymmetry angle ($\gamma$) in the positive direction, the angle ($\gamma$) defining average field direction (41) of the rotor relative to average field direction (39) of the stator, and a critical detent torque ($M_{K1kr}$) being active in a parallel position of the stator field (39) and the rotor field (41), and a starting device provided with rotational backlash between a driving member (13) connected to the rotor (11) and a load-side member (19), and with a directional blocking device (22), a backlash angle ($\epsilon$) of rotational backlash between the load-side and the driving members, through which angle the members can rotate relative to each other in the disengaged condition, being limited in the positive and the negative direction of rotation by means of positive and negative backlash walls (38, 49) of the members wherein for loads for which the critical detent torque is smaller than a load torque prevailing during running-out or starting in a parallel position there is provided a directional blocking device (22) which intervenes depending upon the position of the rotor (11), which device in the 180° spaced-apart rotational positions of the rotor, without the cooperation of the load-side member (19), which is coupled via rotational backlash, influences the rotor (11) to block the positive direction of rotation in which the field direction (41) of magnetisation of the rotor (11) and the stator field direction (39) subtend a negative blocking angle (K) larger than the asymmetry angle ($\gamma$), and in other rotor positions does not obstruct the rotation of the rotor, the backlash angle ($\epsilon$) is larger than the blocking angle (K), and the quotient of load friction torque and load inertial moment is larger than the quotient of detent torque and rotor inertial moment.

2. A single-phase synchronous motor as claimed in claim 1, characterized in that the backlash angle ($\epsilon$) is larger than 90° minus the asymmetry angle ($\gamma$), said backlash angle being preferably 120° to 140°.

3. A single-phase synchronous motor as claimed in claim 1 characterized in that the directional blocking device (22) comprises a blocking member (27) which is movably supported at the housing side and two blocking noses (23) which are rotationally locked to the rotor (11), and the rotational backlash is provided by a coupling member (33), which is formed on the rotor shaft (13) or as a separate part which is fixedly connected to said rotor shaft, which coupling member comprises laterally outward drive projections (15) having substantially radial positive and negative rotor-backlash walls (38, 49), and a member (19) situated on the load, which member engages around the coupling member (33) with inward load projections (37) having substantially radial positive and negative load-backlash walls (35, 36), the range of free rotation between the outward and inward projections (15, 37) being equal to the backlash angle ($\epsilon$).

4. A two-pole single-phase synchronous motor having a stator 3 and a permanent-magnet rotor (11) with a magnetic detent torque, which viewed over one revolution exhibits positive and negative values with resulting stable and unstable rotor rest positions, where positive refers to the direction of rotation of the rotor and negative the opposite, the stable rest positions of the rotor being offset in the positive direction by an asymmetry angle ($\gamma$) which defines average field direction (41) of the rotor relative to average field direction (39) of the stator, and a critical detent torque ($M_{K1kr}$) being active in a parallel position of the stator field (39) and the rotor field (41), and a starting device provided with rotational backlash between a driving member connected to the rotor (11) and a load-side member, and with a directional blocking device (22), a backlash angle ($\epsilon$) of rotational backlash between the load-side and the driving members, through which angle the members can rotate relative to each other in the disengaged condition, being limited in the positive and the negative directions of rotation by means of positive and negative backlash walls of the members wherein a drive pinion (50) is arranged on the rotor (11), and meshes with a transmission wheel (51) having an integral reduction ratio relative to the drive pinion (50), on the transmission wheel (51) there is provided a coupling member (33) having laterally inward drive projections (37g) with positive and negative rotor-backlash walls (38g, 49g), which drive projections cooperate with load projections (15g) provided on a load shaft (20) and having load-backlash walls (35g, 36g), the transmission wheel (51) is provided with a number of blocking noses (23), corresponding in number to twice the reduction ratio, which blocking noses in conjunction with a blocking member (27), which is dependent upon transmission wheel (51) position and hence directly dependent upon rotor position block the positive direction of rotation of the rotor (11) in a rotary position in which the direction of magnetisation (41) of the rotor (11) and the stator field direction (39) subtend a negative blocking angle (K) larger than the asymmetry angle ($\gamma$), and in other rotor positions do not obstruct the rotation of the rotor, a backlash angle ($\epsilon$) is provided between the rotor-backlash walls (38g, 49g) of the coupling member (33) arranged on the transmission wheel (51) and the load-backlash walls (35g, 36g) of the load projections (15g) arranged on the load shaft (20) to allow a free rotation of the rotor (11) through an angle larger than the blocking angle (K), said backlash angle being preferably larger than 90° ($\gamma$), and the quotient of load friction torque and load inertial moment is larger than the quotient of detent torque and rotor inertial moment.

5. A single-phase synchronous motor as claimed in claim 4, characterized in that the reduction ratio is 1:4 and during engagement of the negative rotor-backlash and load-backlash walls in the parallel position the blocking angle (K'), i.e. the free angle through which the blocking noses (23) on the transmission wheel (51) can move in the negative direction of rotation of the transmission wheel (51) before one of said projections abuts against the blocking member (27), is approximately 22.5°.

6. A two-pole single-phase synchronous motor having a stator and a permanent-magnet rotor (11) with a magnetic detent torque, which viewed over one revolution exhibits positive and negative values with resulting stable and unstable rotor rest positions, where positive refers to the direction of rotation of the rotor and negative the opposite, the stable rest positions of the rotor being offset by an asymmetry angle ($\gamma$) in the positive direction, the angle ($\gamma$) defining average field direction of the rotor relative to average field direction (39) of the stator, and a critical detent torque ($M_{K1kr}$) being active in a parallel position of the stator field (39) and the rotor field (41), and a starting device provided with rotational backlash between a driving member connected to the rotor (11) and a load-side member, and with a directional blocking device (22), a backlash angle ($\epsilon$) of rotational backlash between the load-side and the driving members, through which angle the members can rotate relative to each other in the disengaged condition, being limited in the positive and the negative directions of rotation by means of positive and negative backlash walls of the members wherein a drive pinion (50) is arranged on the rotor (11), and meshes with a transmission wheel (51) having an integral reduction ratio relative to the drive pinion (50), on the transmission wheel (51) there is provided a coupling member (33) having one or more laterally inward drive projections (37g) with positive and negative rotor-backlash walls (38g, 49g), for cooperation with at least one load projection (15g) provided on a load shaft (20) and having load-backlash walls (35g, 36g), an element having one or more blocking noses (23) which are uniformly spaced along its circumference is provided on the transmission wheel (51) and cooperates with a blocking member (27) having a blocking pin (31), a backlash angle ($\epsilon$) between the drive projections (37g) and said at least one load projection (15g) is substantially equal to 360° divided by the number of blocking noses (23) which, dependent upon transmission wheel (51) position and hence directly dependent upon rotor position, block the positive direction of rotation of the rotor (11) in a rotary position in which the direction (41) of magnetisation of the rotor (11) and the stator field direction (39) subtend a negative blocking angle (K) larger than the asymmetry angle ($\gamma$) and preferably equal to $-90°$, and do not obstruct the rotation of the rotor in other positions, and the quotient of load friction torque and load inertial moment is larger than the quotient of detent torque and rotor inertial moment.

7. A single-phase synchronous motor as claimed in claim 6, characterized in that the reduction ratio is 1:4 and during engagement of the negative rotor-backlash and load-backlash walls in the parallel position the blocking angle (K'), i.e. the free angle through which the blocking noses (23) on the transmission wheel (51) can move in the negative direction of rotation of the transmission wheel (51) before one of said projections abuts against the blocking member (27), is approximately 22.5°.

8. A two-pole single-phase synchronous motor having a stator and a permanent-magnet rotor (11) with a magnetic detent torque, which viewed over one revolution exhibits positive and negative values with resulting stable and unstable rotor rest positions, where positive refers to the direction of rotation of the rotor and negative the opposite, the stable rest positions of the rotor being offset by an asymmetry angle ($\gamma$) in the positive direction, the angle ($\gamma$) defining average field direction of the rotor relative to average field direction (39) of the stator, and a critical detent torque ($M_{K1kr}$) being active in a parallel position of the stator field (39) and the rotor field (41), and a starting device provided with rotational backlash between a driving member connected to the rotor (11) and a load-side member, and with a directional blocking device (22), a backlash angle ($\epsilon$) of rotational backlash between the load-side and the driving members, through which angle the members can rotate relative to each other in the disengaged condition, being limited in the positive and the negative directions of rotation by means of positive and negative backlash walls of the members wherein a drive pinion (50) is arranged on the rotor (11), and meshes with a transmission wheel (51) having an integral reduction ratio relative to the drive pinion (50), the transmission wheel (51) is provided with at least one arcuate path of movement (17) having rotor-backlash walls (17a, 17b) which limit the backlash movement, the path of movement (17) between the rotor-backlash walls (17a, 17b) is engaged by at least one load projection (115) which is coupled to the load-side member and has load-backlash walls (115a, 115b), two blocking noses (23) are fixedly arranged on the transmission wheel and in conjunction with a blocking member (27) block the transmission wheel (51) in the positive direction of rotation in a position in which the direction (41) of magnetisation of the rotor and the stator field direction (39) subtend a positive or negative blocking angle (K) of approximately 90°, and do not obstruct the rotation of the rotor in other rotor positions, the range of free movement of the load projection (115) along the path of movement exhibits a backlash angle ($\epsilon$) of approximately 180°, and the quotient of load friction torque and load inertial moment is larger than quotient of detent torque and rotor inertial moment.

9. A single-phase synchronous motor as claimed in claim 8, characterized in that the path of movement (17, 17') is a slot and the backlash walls (17a, 17b, 17'a, 17'b) of the path of movement (17, 17') are the slot ends.

10. A single-phase synchronous motor as claimed in claim 8, wherein the transmission wheel is provided with more than one path of movement (17'z, 17''z) each of which cooperates with one load projection (15', 15'') and the paths are situated at different radii in order to obtain a larger backlash angle.

11. A single-phase synchronous motor as claimed in claim 7, characterized in that the reduction ratio is 1:4 and during engagement of the negative rotor-backlash and load-backlash walls in the parallel position the blocking angle (K'), i.e. the free angle through which the blocking noses (23) on the transmission wheel (51) can move in the negative direction of rotation of the transmission wheel (51) before one of said projections abuts against the blocking member (27), is approximately 22.5°.

12. A two-pole single-phase synchronous motor having a stator and a permanent-magnet rotor (11) with a magnetic detent torque, which viewed over one revolution exhibits positive and negative values with resulting stable and unstable rotor rest positions, where positive refers to the direction of rotation of the rotor and negative the opposite, the stable rest positions of the rotor being offset by an asymmetry angle ($\gamma$) in the positive direction, the angle ($\gamma$) defining average field direction of the rotor relative to average field direction (39) of the stator, and a critical detent torque ($M_{K1kr}$) being active in a parallel position of the stator field (39) and the rotor field (41), and a starting device provided with rotational backlash between a driving member connected to the rotor (11) and a load-side member, and with a directional blocking device (22), a backlash angle ($\epsilon$) of the rotational backlash between the load-side and the driving members, through which angle the members can rotate relative to each other in the disengaged condition, being limited in the positive and the negative directions of rotation by means of positive and negative backlash walls of the members wherein a drive pinion (50) is arranged on the rotor (11), and meshes with a transmission wheel (51) having an integral reduction ratio relative to the drive pinion (50), the transmission wheel (51) is provided with at least one drive projection (115') having rotor-backlash walls (115'a, 115'b) and cooperating with at least one load-side path of movement (17′) having load-backlash walls (17′a, 17′b), two blocking noses (23) are fixedly arranged on the transmission wheel and in conjunction with a blocking member (27) block the transmission wheel (51) in the positive direction of rotation in a position in which the direction (41) of magnetisation of the rotor and the stator field direction (39) subtend a positive or negative blocking angle (K) of approximately 90°, and do not obstruct the rotation of the rotor in other rotor positions, the range of free movement of the drive projection (115′) along the path of movement (17′) exhibits a backlash angle (ε) of approximately 180°, and the quotient of load friction torque and load inertial moment is larger than the quotient of detent torque and rotor inertial moment.

13. A single-phase synchronous motor as claimed in claim 12, characterized in that the reduction ratio is 1:4 and during engagement of the negative rotor-backlash and load-backlash walls in the parallel position the blocking angle (K′), i.e. the free angle through which the blocking noses (23) on the transmission wheel (51) can move in the negative direction of rotation of the transmission wheel (51) before one of said projections abuts against the blocking member (27), is approximately 22.5°.

14. A single-phase synchronous motor as claimed in claim 12, characterized in that the path movement (17, 17′) is a slot and the backlash walls (17a, 17b, 17′a, 17′b) of the path of movement (17, 17′) are the slot ends.

15. A single-phase synchronous motor as claimed in claim 12, characterized in that in the case of more than one path of movement ($17'_z$, $17''_z$) each cooperates with one load projection (15′, 15″) and the paths are situated at different radii in order to obtain a larger backlash angle.

* * * * *